No. 748,752. PATENTED JAN. 5, 1904.
E. O. KOENEMAN.
SHIELD FOR CLINICAL THERMOMETERS.
APPLICATION FILED FEB. 16, 1903.
NO MODEL.
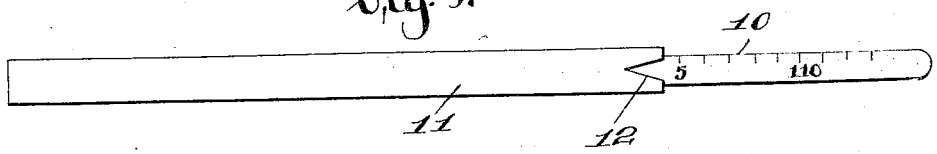
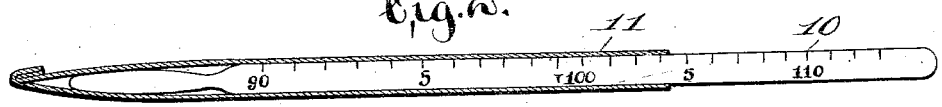
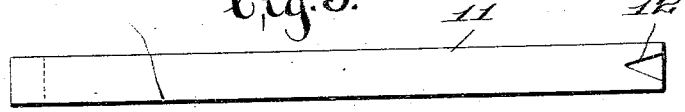

No. 748,752.　　　　　　　　　　　　　　　　　　　　Patented January 5, 1904.

UNITED STATES PATENT OFFICE.

EUGENE O. KOENEMAN, OF ELDORA, IOWA.

SHIELD FOR CLINICAL THERMOMETERS.

SPECIFICATION forming part of Letters Patent No. 748,752, dated January 5, 1904.

Application filed February 16, 1903. Serial No. 143,623. (No model.)

*To all whom it may concern:*

Be it known that I, EUGENE O. KOENEMAN, a citizen of the United States of America, and a resident of Eldora, Hardin county, Iowa, have invented a new and useful Shield for Clinical Thermometers, of which the following is a specification.

The object of this invention is to provide means for receiving and containing a clinical thermometer while in use.

A further object of this invention is to provide means for shielding and protecting a patient from contagion rendered possible through the use of a clinical thermometer.

A further object of this invention is to provide means for disinfecting a clinical thermometer prior to a succeeding use thereof and continuing such disinfection during such succeeding use.

A further object of this invention is to be found in the provision of a shield for a clinical thermometer, which shield shall offer the least possible barrier between the clinical thermometer and the object to which it is applied and at the same time will effectually protect the patient from infection by such thermometer, such infection possibly arising from prior use of the thermometer on infected patients.

My invention consists in the provision of a shield for clinical thermometers, which shield is mounted on and contains the thermometer when in use.

My invention consists, further, in the shield for clinical thermometers which shield possesses antiseptic characteristics and is mounted on and contains the thermometer when in use.

My invention consists, further, in the shield for clinical thermometers composed of a casing or bag of relatively thin material possessing the highest susceptibility to the radiation of heat and also having antiseptic characteristics, which shield is mounted on the thermometer when in use.

My invention consists, further, in the construction, arrangement, and combination of elements hereinafter set forth, pointed out in my claims, and illustrated in the accompanying drawings, in which—

Figure 1 is an elevation illustrating the application of my shield to a thermometer. Fig. 2 is a longitudinal section illustrating the same. Fig. 3 is a plan of the shield removed from the thermometer and illustrating the construction thereof.

In the construction of the device as shown the numeral 10 designates a clinical thermometer of common form, and 11 a bag, shield, or casing arranged to be mounted on said thermometer. The bag, shield, or casing 11 preferably is formed of paper tube formed with a seam on one side and with one end closed and the other end open, and a V-shaped nick or notch 12 is formed in the open end portion of the bag to facilitate the insertion of a thermometer. The paper tube may be formed in any desired manner, such as by pasting margins of a strip of paper together, and one end portion thereof may be closed in any desired manner, such as by folding it back on the body of the tube. The end portion of the thermometer normally introduced to the mouth of a patient and received beneath the tongue of the patient for the purpose of taking a temperature is received and contained in the closed end portion of the shield, bag, or casing 11. The shield, bag, or casing 11 is subjected to an aseptic treatment by immersion in an antiseptic solution of any common and desirable character or formula, or the paper of which said bag, shield, or casing is made may be of antiseptic character.

I do not limit myself to any particular formula nor solution of antiseptic constituent nor antiseptic bath, as various formulas of this character are now common and well known and are used interchangeably at the convenience and desire of the operator.

Heretofore it has been common to mount a clinical thermometer in an antiseptic and disinfecting casing when not in use, and it also has been common to subject a clinical thermometer to an antiseptic bath immediately prior to the introduction thereof to the mouth of the patient in order to minimize the danger of infection and contagion through the repeated use of a thermometer on various patients. I have conceived and demonstrated the desirability of providing a slight barrier of antiseptic characteristics and relatively impenetrable by infectious germs between the mucous membrane or cuticle of the patient and the surface of the thermometer, and in practice I remove such barrier immediately after the use of the thermometer in taking a temperature and substitute a fresh shield therefor immediately prior to a succeeding use of the thermometer on the same or another patient. By such practice I avoid the deposit of infectious germs on the surface of the thermometer by one patient and at the same time through the use of a new shield protect a succeeding patient from any possible infection.

The shields preferably are made as illustrated in Fig. 3 and packed in a casing of any desired form for transportation, from which casing successive shields may be withdrawn and used as desired, the casing itself protecting the shields against the deposit of foreign substances thereon prior to their use.

I claim as my invention—

1. The combination of a clinical thermometer and a paper shield carried temporarily thereon and containing such thermometer when in use, which paper shield possesses antiseptic characteristics.

2. The combination of a clinical thermometer and an antiseptic shield temporarily mounted thereon while in use.

3. The combination of a clinical thermometer and a shield formed with an open end and a closed end and a notch in the open end, which shield is temporarily mounted on said thermometer while the latter is in use.

Signed by me at Eldora, Iowa, this 5th day of July, 1892.

EUGENE O. KOENEMAN.

Witnesses:
C. B. SPARKS,
C. EASTBROOK.